United States Patent
Kakiuchi et al.

(10) Patent No.: US 10,544,489 B2
(45) Date of Patent: Jan. 28, 2020

(54) HIGHLY FORMABLE HIGH-STRENGTH STEEL SHEET, WARM WORKING METHOD, AND WARM-WORKED AUTOMOBILE PART

(75) Inventors: Elijah Kakiuchi, Kobe (JP); Toshio Murakami, Kobe (JP); Hideo Hata, Kobe (JP); Tatsuya Asai, Kakogawa (JP); Naoki Mizuta, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1110 days.

(21) Appl. No.: 13/988,382

(22) PCT Filed: Nov. 16, 2011

(86) PCT No.: PCT/JP2011/076439
§ 371 (c)(1),
(2), (4) Date: May 20, 2013

(87) PCT Pub. No.: WO2012/067159
PCT Pub. Date: May 24, 2012

(65) Prior Publication Data
US 2013/0236350 A1 Sep. 12, 2013

(30) Foreign Application Priority Data

Nov. 18, 2010 (JP) ................................. 2010-258151
Aug. 22, 2011 (JP) ................................. 2011-180616

(51) Int. Cl.
| | |
|---|---|
| C22C 38/02 | (2006.01) |
| C22C 38/38 | (2006.01) |
| C22C 38/00 | (2006.01) |
| C22C 38/04 | (2006.01) |
| C22C 38/06 | (2006.01) |
| B21D 11/22 | (2006.01) |
| C22C 38/08 | (2006.01) |
| C22C 38/12 | (2006.01) |
| C22C 38/14 | (2006.01) |
| C22C 38/16 | (2006.01) |

(52) U.S. Cl.
CPC .............. *C22C 38/38* (2013.01); *B21D 11/22* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01)

(58) Field of Classification Search
CPC ....... C22C 1/02; C22C 38/001; C22C 38/002; C22C 38/02; C22C 38/04; C22C 38/06; C22C 38/08; C22C 38/12; C22C 38/14; C22C 38/16; C22C 38/38; C21D 1/20; C21D 8/0236; C21D 8/0273; C21D 8/0426; C21D 9/48; C21D 2211/002; C21D 2211/008; B21D 11/22
See application file for complete search history.

(56) References Cited

U.S. PATENT DOCUMENTS

| | | | |
|---|---|---|---|
| 7,468,109 B2 * | 12/2008 | Kashima | ............... B32B 15/012 |
| | | | 148/320 |
| 7,591,977 B2 | 9/2009 | Ikeda et al. | |
| 7,767,036 B2 | 8/2010 | Kashima et al. | |
| 7,887,648 B2 | 2/2011 | Kinugasa et al. | |
| 8,197,617 B2 | 6/2012 | Nakaya et al. | |
| 8,343,288 B2 | 1/2013 | Murakami et al. | |
| 2004/0238084 A1 | 12/2004 | Mega et al. | |
| 2005/0150580 A1 | 7/2005 | Akamizu et al. | |
| 2008/0251160 A1 | 10/2008 | Akamizu et al. | |
| 2009/0053096 A1 | 2/2009 | Miura et al. | |
| 2009/0242085 A1 | 10/2009 | Ikeda et al. | |
| 2009/0277547 A1 | 11/2009 | Saito et al. | |
| 2010/0080728 A1 | 4/2010 | Ikeda et al. | |
| 2010/0092332 A1 | 4/2010 | Ikeda et al. | |

(Continued)

FOREIGN PATENT DOCUMENTS

| | | |
|---|---|---|
| CN | 1518607 A | 8/2004 |
| JP | 2004 190050 | 7/2004 |

(Continued)

OTHER PUBLICATIONS

"Carbon Steels and Alloy Steels", Modern Steels and Their Properties, Bethlehem Steel Corporation, 1980, p. 19-23.*
Kajima et al., English machine translation of JP 2004-190050, Jul. 2004, p. 1-21.*
Takahashi, M., "Development of High Strength Steels for Automobiles," Technical Report of Nippon Steel, vol. 378, pp. 2 to 6, (2003) (with English abstract).
Sugimoto, K. et al., "Warm Formability of Ultra High-Strength Low Alloy TRIP-aided Sheet Steels with Bainitic Ferrite Matrix," Iron and Steel, vol. 91, No. 2, pp. 34 to 40, (Feb. 1, 2005) (with English abstract).
International Search Report dated Feb. 14, 2012 in PCT/JP11/76439 Filed Nov. 16, 2011.
Extended European Search Report issued Jun. 3, 2016 in Patent Application No. 11841973.8.

(Continued)

*Primary Examiner* — Jophy S. Koshy
(74) *Attorney, Agent, or Firm* — Oblon, McClelland, Maier & Neustadt, L.L.P.

(57) ABSTRACT

A high-strength steel sheet has a chemical composition including 0.05% to 0.3% of C, 1% to 3% of Si, 0.5% to 3% of Mn, 0% to 0.1% of P, 0.001% to 0.1% of Al, and 0.002% to 0.03% of N, in mass percent; further includes iron and impurities; and has a structure including 50% to 90% of bainitic ferrite, 5% to 20% of retained austenite ($\gamma_R$), a total of 10% to 50% of martensite and the retained austenite, and 0% to 40% of polygonal ferrite, in area percent based on the entire structure. The retained austenite has a carbon content ($C\gamma_R$) of 0.5% to 1.2% by mass, an average equivalent circle diameter of 0.2 to 2 μm, and an average aspect ratio (maximum diameter/minimum diameter) of less than 3.0. The high-strength steel sheet excels both in elongation and deep drawability while having a strength of 980 MPa or more.

5 Claims, 1 Drawing Sheet

(56) References Cited

U.S. PATENT DOCUMENTS

| | | |
|---|---|---|
| 2010/0221138 A1 | 9/2010 | Nakaya et al. |
| 2010/0252147 A1 | 10/2010 | Murakami et al. |
| 2011/0146852 A1 | 6/2011 | Matsuda et al. |
| 2011/0162762 A1 | 7/2011 | Matsuda et al. |
| 2012/0009434 A1 | 1/2012 | Hata et al. |
| 2012/0012231 A1 | 1/2012 | Murakami et al. |
| 2013/0022490 A1 | 1/2013 | Hata et al. |

FOREIGN PATENT DOCUMENTS

| | | |
|---|---|---|
| JP | 2010 65272 | 3/2010 |
| JP | 2010-100896 | 5/2010 |
| JP | 2010 116593 | 5/2010 |
| WO | 95 29268 | 11/1995 |
| WO | WO 2010/029983 A1 | 3/2010 |
| WO | WO 2010/030021 A1 | 3/2010 |

* cited by examiner (a) INVENTIVE STEEL SHEET (STEEL SHEET No. 28)
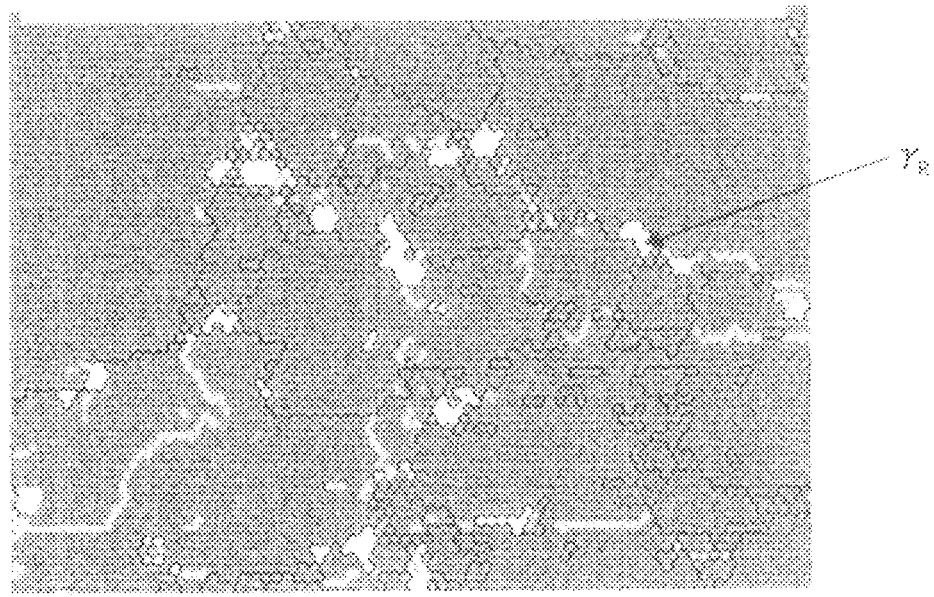
(b) COMPARATIVE STEEL SHEET (STEEL SHEET No. 24)
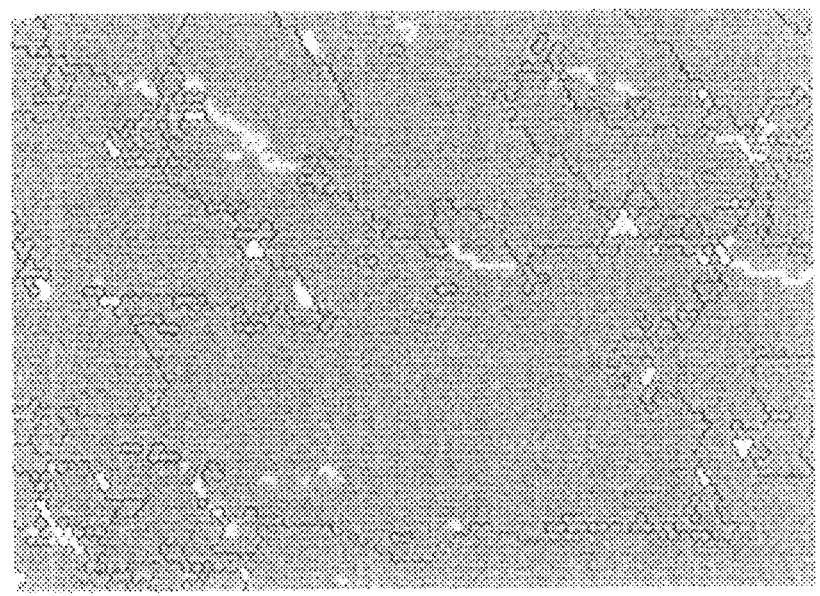
← 2 μm →

HIGHLY FORMABLE HIGH-STRENGTH STEEL SHEET, WARM WORKING METHOD, AND WARM-WORKED AUTOMOBILE PART

CROSS-REFERENCE TO RELATED APPLICATIONS

This application is a National Stage of PCT/JP2011/076439 filed on Nov. 16, 2011. This application is based upon and claims the benefit of priority to Japanese Application No. 2010-258151 filed on Nov. 18, 2010, and to Japanese Application No. 2011-180616 filed on Aug. 22, 2011, the contents of which are incorporated by reference in their entireties.

BACKGROUND OF THE INVENTION

Technical Field

The present invention relates to highly formable high-strength steel sheets, warm working methods using the high-strength steel sheets, and warm-worked automobile parts. High-strength steel sheets according to the present invention include cold-rolled steel sheets, hot-dip galvanized steel sheets, and hot-dip galvannealed steel sheets.

Background Art

Thin steel sheets for use in automobile framework parts face demands for higher strengths to improve crashworthiness and fuel efficiency. The steel sheets should therefore surely have satisfactory stamping performance (stamping formability) while having high strengths on the order of 980 MPa or more. Steels utilizing transformation induced plasticity (TRIP) effects are known to be effective for high-strength steel sheets with strengths on the order of 980 MPa or more to ensure both higher strengths and satisfactory formability (see, for example, Patent Literature (PTL) 1).

PTL 1 discloses a high-strength steel sheet including bainite or bainitic ferrite as a main phase and containing retained austenite ($\gamma_R$) in a content of 3% or more in area percent. This high-strength steel sheet, however, has an elongation of less than 20% at a tensile strength of 980 MPa or more and is demanded to have further improved mechanical properties (hereinafter also simply referred to as "properties").

Independently, such TRIP-aided steel sheets are known to have superiority not only in ductility, which is represented by elongation measured by uniaxial tensile testing, but also in deep drawability (see, for example, Non Patent Literature (NPL) 1 and PTL 2). Specifically, deep drawability of steel sheets are generally considered to vary depending on the r value. However, in deep drawing of the TRIP-aided steel sheets, a vertical wall has better ductility due to the TRIP effects, but, in contrast, a shrink-flange becomes resistant to hardening due to suppression of the TRIP phenomenon, allows metal flow, and exhibits better deep drawability.

However, these findings, if without modification, are not applicable to TRIP-aided steel sheets having strengths on the order of 980 MPa or more, although they are applicable to TRIP-aided steel sheets having strengths on the order of 780 MPa or less.

For this reason, improvements in deep drawability, which is one of most important indices for formability, are important for ultrahigh-strength steel sheets having strengths on the order of 980 MPa or more.

In contrast, even TRIP-aided steel sheets have limitations in formability in cold forming (cold working). To remedy the disadvantage and to further improve elongation, there have been proposed techniques of warm-working a TRIP-aided steel sheet at a temperature of 100° C. to 400° C. to exhibit TRIP effects further effectively to thereby improve elongation (see NPL 2 and PTL 3).

The techniques allow a structure mainly containing bainitic ferrite to further contain retained austenite having a carbon content of 1% or more in mass percent and thereby allow the resulting steel sheets to have an improved elongation at around 200° C. of up to 23% at a tensile strength on the order of 1200 MPa, as indicated in Table 2 of PTL 3. These steel sheets, however, include excessively stabilized retained austenite by containing carbon in a content of 1% in mass percent or more and may speculatively suffer from insufficient TRIP effects under such conditions that retained austenite becomes further stable. For example, excessively stabilized retained austenite may be formed at a temperature of around 200° C. In addition, these steel sheets contain large amounts of long slender retained austenite having high aspect ratios as indicated in the table just mentioned above, and speculatively have insufficient deep draw formability (deep drawability), although this property is not evaluated in PTL 3.

CITATION LIST

Patent Literature

PTL 1: Japanese Unexamined Patent Application Publication (JP-A) No. 2003-19319
PTL 2: PCT International Publication Number WO Number 95/29268 PTL 3: JP-A No. 2004-190050

Non Patent Literature

NPL 1: M. TAKAHASHI, "Development of High Strength Steel Sheets for Automobiles," Nippon Steel Technical Report, 378:2-6 (2003)
NPL 2: K Sugimoto; S. M. Song; J. Sakaguchi; A. Nagasaka; and T. Kashima, "Warm Formability of Ultra High-strength Low Alloy TRIP-aided Sheet Steels With Bainitic Ferrite Matrix," TETSUTOHAGANE-JOURNAL OF THE IRON AND STEEL INSTITUTE OF JAPAN, 91(2)34-40 (2006)

SUMMARY OF INVENTION

Technical Problem

The present invention has been made under these circumstances, and an object thereof is to provide a high-strength steel sheet which has both satisfactory elongation and good deep drawability while surely having a strength on the order of 980 MPa or more. Another object of the present invention is to provide a warm working method using the high-strength steel sheet. Still another object of the present invention is to provide an automobile part which has been warm-worked by the method.

Solution to Problem

The present invention provides, in a first embodiment, a highly formable high-strength steel sheet which has a chemical composition including:

C in a content of 0.05% to 0.3%;
Si in a content of 1% to 3%;
Mn in a content of 0.2% to 3%;
P in a content of 0% to 0.1%;
S in a content of 0% to 0.01%;
Al in a content of 0.001% to 0.1%; and
N in a content of 0.002% to 0.03%,
in mass percent,
in which
the steel sheet further includes iron and impurities;
the steel sheet has a structure including:
bainitic ferrite in a content of 50% to 90%;
retained austenite in a content of 5% to 20%;
a total of martensite and the retained austenite in a content of 10% to 50%; and
polygonal ferrite in a content of 0% to 40%,
in area percent based on the entire structure; and
the retained austenite has a carbon content ($C\gamma_R$) of 0.5% to 1.2% in mass percent, an average equivalent circle diameter of 0.2 to 2 μm, and an average aspect ratio of less than 3.0, where an aspect ratio of a retained austenite grain is expressed as a ratio of a maximum diameter to a minimum diameter of the grain.

In a second embodiment of the present invention, the highly formable high-strength steel sheet may further include at least one element selected from the group consisting of:
Cr in a content of 0.01% to 3%;
Mo in a content of 0.01% to 1%;
Cu in a content of 0.01% to 2%;
Ni in a content of 0.01% to 2%; and
B in a content of 0.00001% to 0.01%.

In a third embodiment of the present invention, the highly formable high-strength steel sheet may further include at least one element selected from the group consisting of:
Ca in a content of 0.0005% to 0.01%;
Mg in a content of 0.0005% to 0.01%; and
a rare-earth element (REM) in a content of 0.0001% to 0.01%.

The present invention provides, in a fourth embodiment, a method of warm-working a high-strength steel sheet. The meted includes the steps of heating the high-strength steel sheet of any one of the first, second, and third embodiments up to a temperature of 200° C. to 400° C.; and working the high-strength steel sheet within 3600 seconds after the heating.

In addition, the present invention provides, in a fifth embodiment, an automobile part worked by the method of the fourth embodiment, in which the automobile part includes a mixture of at least one region receiving a true strain of 0.05 or more and at least one region receiving a true strain of less than 0.05 upon working; and a difference in yield strength between a region receiving a maximum true strain and a region receiving a minimum true strain upon working is 200 MPa or less.

Advantageous Effects of Invention

The present invention can provide a high-strength steel sheet having both satisfactory elongation and good deep drawability while surely having a strength on the order of 980 MPa or more; a warm working method using the high-strength steel sheet; and an automobile part which has been warm-worked by the warm working method, because the high-strength steel sheet has structures including bainitic ferrite in a content of 50% to 90%; retained austenite in a content of 5% to 20%; martensite and the retained austenite in a total content of 10% to 50%; polygonal ferrite in a content of 0% to 40%, in area percent based on the entire structure, in which the retained austenite has a carbon content ($C\gamma_R$) of 0.5% to 1.2% in mass percent, an average equivalent circle diameter of 0.2 to 2 μm, and an average aspect ratio (maximum diameter/minimum diameter) of less than 3.0.

BRIEF DESCRIPTION OF DRAWINGS

FIG. 1 depicts photographs of cross-sectional structures of (a) a steel sheet according to an embodiment of the present invention; and (b) a comparative steel sheet.

DESCRIPTION OF EMBODIMENTS

As has been described above, the present inventors focused attention on a TRW-aided steel sheet which contains bainitic ferrite having a substructure (matrix) with a high dislocation density and retained austenite ($\gamma_R$), as with the background technologies and made intensive investigations to further improve elongation and deep drawability of the steel sheet while ensuring a satisfactory strength.

As a result, the present inventors have found that the objects can be achieved in the following manner. (1) Martensite is partially introduced into the structure of the steel sheet to ensure a satisfactory strength. (2) Retained austenite having a carbon content of 0.5% to 1.2% (in mass percent) is contained in the steel sheet in a content of 5% or more (in area percent), and this allows the steel sheet to have a higher elongation aided by TRIP effects. In addition, (3) the retained austenite is controlled in dimensions to have an average equivalent circle diameter of 0.2 to 2 μm and an aspect ratio of less than 3.0; this increases the strain applied to the vicinity of the retained austenite upon strain-induced martensitic transformation and thereby more effectively suppresses transformation of the retained austenite into strain-induced martensite upon compression such as in shrink-flanging. Thus, the steel sheet can have better deep drawability through ensuring of ductility of the vertical wall and acceleration of metal flow from the flange. The present invention has been made based on these findings.

Initially, a structure characterizing a steel sheet according to an embodiment of the present invention (hereinafter also briefly referred to as an "inventive steel sheet") will be illustrated below.

[Structure of Inventive Steel Sheet]

The inventive steel sheet has a structure based on that of a TRIP-aided steel as with the above-mentioned background technologies, but differs from the background technologies in that the inventive steel sheet contains martensite in a predetermined amount and contains 5% or more in area percentage of retained austenite having a carbon content of 0.5% to 1.2% in mass percent; and in that the retained austenite has such controlled dimensions of an average equivalent circle diameter of 0.2 to 2 μm and an aspect ratio of less than 3.0.

<Bainitic Ferrite: 50% to 90%>

The "bainitic ferrite" herein obviously differs from a bainitic structure which has a substructure including a lath-like structure with a high dislocation density and which includes no carbides in the structure. The bainitic ferrite also differs from a polygonal ferrite structure having a substructure with no or very little dislocation density; and differs from a quasi-polygonal ferrite structure having a substructure such as a fine subgrain (see Atlas for Bainitic Microstructures Vol. 1," The Iron and Steel Institute of Japan, Bainite Committee).

Thus, the inventive steel sheet has structures including bainitic ferrite as a matrix and can have better balance between strength and formability, because the bainitic structure is uniform, fine, and ductile, has a high dislocation density, and exhibits a high strength.

The inventive steel sheet may include the bainitic ferrite structure in an amount of 50% to 90% (preferably 60% to 90%; and more preferably 70% to 90%) in area percent based on the entire structure. This allows the bainitic ferrite structure to exhibit the advantages effectively. The amount of the bainitic ferrite structure may be determined in consideration of balance with retained austenite and is recommended to control appropriately so as to exhibit desired properties.

<Retained Austenite ($\gamma_R$): 5% to 20% in Area Percent Based on Entire Structure>

The retained austenite is effective for better total elongation. To exhibit this advantage effectively, retained austenite may be contained in an amount of 5% or more (preferably 10% or more, and more preferably 15% or more) in area percent based on the entire structure. However, retained austenite, if present in an excessively large amount, may cause excessively lowered stretch flangeability, and to avoid this, the upper limit of the amount of retained austenite may be 20%.

<Total of Martensite and the Retained Austenite ($\gamma_R$): 10% to 50%>

Martensite is partially introduced into the structure for providing a satisfactory strength. However, martensite in an excessively large amount may cause insufficient formability. To avoid this, the total content of martensite and the retained austenite may be controlled to 10% or more (preferably 12% or more, and more preferably 16% or more) and 50% or less in area percent based on the entire structure.

<Polygonal Ferrite: 0% to 40%>

Polygonal ferrite is a soft phase and is effective for better ductility. For this reason, the steel sheet may further include polygonal ferrite in a content of 40% or less (preferably 30% or less) in area percent so as to ensure satisfactory strength.

<Carbon Content ($C\gamma_R$) of Retained Austenite ($\gamma_R$): 0.5% to 1.2% in Mass Percent>

The carbon content ($C\gamma_R$) of retained austenite is an index affecting the stability of transformation of retained austenite to martensite upon working. A retained austenite having an excessively low carbon content $C\gamma_R$ may be unstable and may cause strain-induced martensitic transformation after the application of stress and before plastic deformation, and this may result in insufficient bulging formability. In contrast, a retained austenite having an excessively high carbon content $C\gamma_R$ may become excessively stable, and this may impede strain-induced martensitic transformation even upon working, thus resulting in insufficient bulging formability. To provide sufficient bulging formability, the retained austenite may have a carbon content $C\gamma_R$ of 0.5% to 1.2% and preferably 0.6% to 1.1% in mass percent.

<Average Equivalent Circle Diameter: 0.2 to 2 μm, Average Aspect Ratio (Maximum Diameter/Minimum Diameter): Less Than 3.0 in Retained Austenite ($\gamma_R$)>

These parameters are controlled to allow retained austenite to be coarse and to have an approximately equiaxial shape. Thus, martensitic transformation is more effectively suppressed in shrink-flanging, and deep drawability is increased. In addition, when becoming coarse and equiaxial, the retained austenite is somewhat unstable at room temperature. Thus, the steel sheet includes a large amount of retained austenite providing suitable stability upon warm forming at around 300° C. and thereby has both higher elongation and better deep drawability upon warm forming.

To exhibit effects of coarsening of retained austenite effectively, the retained austenite may have an average equivalent circle diameter of 0.2 μm or more. However, excessively coarse retained austenite may be present as grains in an excessively small number and may be difficult to suppress martensitic transformation upon shrink-flanging effectively. To avoid this, an upper limit of the average equivalent circle diameter may be 2 μm.

To exhibit effects of allowing retained austenite to be equiaxial effectively, the retained austenite may have an average aspect ratio (maximum diameter/minimum diameter) of less than 3.0.

<Other Structure: Bainite (0% or More)>

The inventive steel sheet may include the aforementioned structures alone (as a mixed structure of martensite, bainitic ferrite, polygonal ferrite, and retained austenite), but may further include bainite as another structure within a range not adversely affecting the operation of the present invention. The bainitic structure may inevitably remain in the manufacturing process of the inventive steel sheet, but is preferably minimized, and is recommended to be controlled to 5% or less, and more preferably 3% or less, in area percent based on the entire structure.

[Methods for Measuring Area Percentage of Respective Phases; and Carbon Content ($C\gamma_R$), Average Equivalent Circle Diameter, and Aspect Ratio of Retained Austenite $\gamma_R$]

Methods for measuring area percentages of respective phases, carbon content ($C\gamma_R$) of retained austenite, and average equivalent circle diameter and aspect ratio of retained austenite will be described below.

Area percentages of respective structures in the steel sheet are measured by subjecting the steel sheet to LePera etching, defining, for example, a white region as "martensite and retained austenite ($\gamma_R$)" through observation with an optical microscope (at 1000-fold magnification), and measuring area percentages of respective structures.

The area percentage and the carbon content ($C\gamma_R$) of retained austenite are measured by grinding the steel sheet to a depth of one-fourth the thickness thereof chemically polishing the ground steel sheet, and measuring the parameters through X-ray diffractometry (ISIJ Int. Vol. 33(1933), No. 7, p. 776). The area percentage of polygonal ferrite is measured in the following manner. The steel sheet is subjected to Nital etching, a massive white region having an equivalent circle diameter of 5 μm or more is identified as ferrite through observation with an optical microscope (at 400-fold magnification), and whose area percentage is measured. In addition, pearlite and other structures are identified and whose area percentages are measured through observation with an optical microscope (at 1000-fold magnification), and a region other than the "martensite and retained austenite ($\gamma_R$)," "polygonal ferrite," and "other structures" is defined as bainitic ferrite, and whose area percentage is calculated.

The average equivalent circle diameter of retained austenite is determined by measuring distribution of an austenite ($\gamma$) phase in an area of 30 μm by 30 μm or larger through electron back scatter diffraction pattern (EBSP) analysis at steps (intervals) of 0.2 μm; defining a region where austenite phases are connected to each other as one austenite grain; measuring areas of austenite grains respectively; converting measured areas into equivalent circle diameters; and arithmetically averaging the equivalent circle diameters of the respective austenite grains. The average aspect ratio of retained austenite is determined by measuring a maximum Feret's diameter and a minimum Feret's diameter of each austenite grain, defining the ratio (maximum diameter to minimum diameter) thereof as an aspect ratio, and arithmetically averaging the aspect ratios of the respective austenite grains.

Next, chemical compositions constituting the inventive steel sheet will be described. All chemical compositions are indicated in mass percent.

[Chemical Composition of Inventive Steel Sheet]

C: 0.05% to 0.3%

Carbon (C) element is essential for obtaining desired major structures (bainitic ferrite, martensite, and retained austenite) while ensuring a high strength. To exhibit these actions effectively, carbon may be contained in a content of 0.05% or more, preferably 0.10% or more, and more preferably 0.15% or more. However, a steel sheet containing carbon in a content of more than 0.3% may not be suitable for welding.

Si: 1% to 3%

Silicon (Si) element effectively inhibits retained austenite from decomposing into carbides. Si is also useful particularly as a solute strengthening element. To exhibit these actions effectively, Si may be contained in a content of 1% or more, preferably 1.1% or more, and more preferably 1.2% or more. However, Si, if contained in a content of more than 3%, may impede the formation of bainitic ferrite and martensite structures, may cause the steel sheet to have higher hot deformation resistance, may often cause embrittlement of the resulting weld bead, and may adversely affect the surface quality of the steel sheet. To avoid these, the Si content may be 3% in upper limit, and is preferably 2.5% or less, and more preferably 2% or less.

Mn: 0.5% to 3%

Manganese (Mn) element effectively acts as a solute strengthening element, promotes transformation, and thereby accelerates the formation of bainitic ferrite and martensite structures. This element is also necessary for stabilizing austenite to thereby give a desired retained austenite. To exhibit these actions effectively, Mn may be contained in a content of 0.5% or more, preferably 0.7% or more, and more preferably 1% or more. However, Mn, if contained in a content of more than 3%, may cause disadvantages such as slab cracking. The Mn content is preferably 2.5% or less, and more preferably 2% or less.

P: 0% to 0.1%

Phosphorus (P) element is inevitably present as an impurity element, but may be added to ensure a desired retained austenite. However, phosphorus, if contained in a content of more than 0.1%, may adversely affect secondary workability. The phosphorus content is more preferably 0.03% or less.

S: 0% to 0.01%

Sulfur (S) element is also present as an impurity element, forms MnS and other sulfide inclusions to cause cracking, and thereby adversely affects workability. To avoid these, the sulfur content may be 0.01% or less, and more preferably 0.005% or less.

Al: 0.001% to 0.1%

Aluminum (Al) element acts as a deoxidizer and, in cooperation with Si, effectively inhibits retained austenite from decomposing into carbides. To exhibit these actions effectively, Al may be present in a content of 0.001% or more. However, Al, if present in an excessively high content, may exhibit saturated effects and be economically wasteful. To avoid these, the upper limit of the Al content may be 0.1%.

N: 0.002% to 0.03%

Nitrogen (N) element is inevitably present, but is combined with Al, Nb, and other carbonitride-forming elements to form precipitates, and thereby contributes to higher strengths and finer structures. A steel having an excessively low nitrogen content may suffer from excessively coarsened austenite grains, thereby mainly include an elongated lath-like structure, and have a large aspect ratio of retained austenite. A steel having an excessively high nitrogen content, if being a low carbon steel as in the present invention, may be resistant to casting and may fail to give a steel sheet.

The steel for use herein basically contains the compositions and further substantially includes iron and inevitable impurities. The steel may further contain one or more of the following compositions within ranges not adversely affecting the operation of the present invention.

At least one element selected from the group consisting of

Cr: 0.01% to 3%;
Mo: 0.01% to 1%;
Cu: 0.01% to 2%;
Ni: 0.01% to 2%; and
B: 0.00001% to 0.01%.

These elements are effective as steel strengthening elements, effectively stabilize retained austenite, and effectively ensure a predetermined amount of retained austenite. To exhibit these actions effectively, it is recommended to add at least one element selected from the group consisting of Cr in a content of 0.01% or more (preferably 0.05% or more); Mo in a content of 0.01% or more (more preferably 0.02% or more); Cu in a content of 0.01% or more (more preferably 0.1% or more); Ni in a content of 0.01% or more (more preferably 0.1% or more); and B in a content of 0.00001% or more (more preferably 0.0002% or more). However, Cr in a content of more than 3%; Mo in a content of more than 1%; Cu and Ni each in a content of more than 2%; and B in a content of more than 0.01% may exhibit saturated effects and be economically wasteful. More preferably, the Cr content is 2.0% or less, Mo content is 0.8% or less, Cu content is 1.0% or less, Ni content is 1.0% or less, and B content is 0.0030% or less.

At least one element selected from the group consisting of

Ca in a content of 0.0005% to 0.01%;
Mg in a content of 0.0005% to 0.01%; and
at least one rare-earth element (REM) in a content of 0.0001% to 0.01%.

These elements control the form of sulfides in the steel and effectively help the steel to have better workability. As used herein the term "rare-earth element" refers to and includes Sc, Y, and lanthanoids. To exhibit the actions effectively, it is recommended to add at least one of Ca and Mg each in a content of 0.0005% or more (more preferably 0.001% or more), and a REM in a content of 0.0001% or more (more preferably 0.0002% or more). However, Ca and Mg each in a content of more than 0.01%; and a REM in a content of more than 0.01% may exhibit saturated effects and be economically wasteful. More preferably, the Ca and Mg contents are each 0.003% or less; and REM content is 0.006% or less.

[Warm Working Method]

The inventive steel sheet exhibits satisfactory elongation and good deep drawability even at room temperature and is applicable to cold working to be formed into a part. However, it is particularly recommended to heat the steel sheet to an appropriate temperature of from 200° C. to 400° C.; and to work the heated steel sheet within 3600 seconds (more preferably within 1200 seconds) after the heating.

The working at such a temperature as to optimize the stability of retained austenite before initiation of its decomposition can maximize the elongation and deep drawability.

[Automotive Part]

Automotive parts worked by the warm working method excel in elongation and deep drawability. Among them, preferred is an automobile part including a mixture of at least one region receiving a true strain of 0.05 or more upon working and at least one region receiving a true strain of less than 0.05 upon working; in which a difference in yield strength between a region receiving a maximum true strain and a region receiving a minimum true strain upon working is 200 MPa or less.

Steel sheets containing retained austenite generally have low yield ratios and high hardening rates at low strains. These steel sheets have strengths after the application of stress, particularly yield strength, varying extremely significantly depending on strain in a region receiving a small strain. When parts are formed by stamping, a strain amount differs from a region to another, and there may be a partial region which receives little strain in the resulting parts. Some parts may therefore suffer from a difference in strength between a region receiving working (strain) and another region receiving substantially no working (strain) and thereby suffer from a strength distribution. A part, if having such a strength distribution, may undergo yield of the low-strength region to thereby undergo deformation or buckling. For this reason, the region or portion with a lowest strength will determine the strength of the part.

Steels containing retained austenite have a low yield strength probably because martensite is formed simultaneously with the introduction of retained austenite and introduces mobile dislocation into the surrounding matrix upon transformation. Accordingly, by inhibiting the dislocation even in a region receiving a small quantity of working, the resulting steel may have a higher yield strength to give a part having a higher strength. The movement of mobile diskration may be effectively suppressed by heating the material steel to remove mobile dislocation or by fixing the mobile dislocation through strain aging typically of solute carbon, resulting in a higher yield strength For these reasons, when a steel sheet containing retained austenite is heated to an appropriate temperature of from 200° C. to 400° C. and then stamped (warm-worked), even a region receiving small strain can have a higher yield strength. This reduces the strength distribution in the part and allows the part to have a higher strength.

Specifically, of parts including a mixture of at least one region receiving a true strain of 0.05 or more and at least one region receiving a true strain of less than 0.05 each upon the stamping (warm working) in a coexisting manner and thereby having a low-strain region, a part having a difference in yield strength of 200 MPa or less between a region receiving a maximum true strain and a region receiving a minimum true strain has a small strength distribution therein, has a high strength as a whole, and is more advantageous as an automobile part.

Next, a preferred manufacturing method to manufacture an inventive steel sheet will be illustrated below.

[Preferred Manufacturing Method of Inventive Steel Sheet]

An inventive steel sheet may be manufactured by subjecting a steel having a chemical composition satisfying the above conditions sequentially to hot rolling, cold rolling, and a heat treatment. To allow retained austenite grains to have larger sizes, a coarse initial structure is desirable.

[Hot Rolling Conditions]

For the above purpose, the finish temperature in hot rolling (finishing mill delivery temperature; EDT) is preferably set to a relatively high temperature of 900° C. to 1000° C., and the coiling temperature is preferably set to a relatively high temperature of 600° C. to 700° C. each compared to those of customary techniques. The resulting hot-rolled steel thereby has a coarse structure as compared to those of customary techniques. Thus, a structure formed as a result of the subsequent heat treatment process may become coarse, resulting in larger sizes of retained austenite grains.

[Cold Rolling Conditions]

Cold rolling herein is preferably performed to a small cold rolling reduction of 10% to 30% (more preferably 10% to 20%). This may allow a recrystallized structure to be coarse upon heating in the subsequent heat treatment process and allow a reverse-transformed structure to be coarse upon cooling.

[Heat Treatment Conditions]

To obtain a desired structure, a heat treatment may be performed under conditions below. Specifically, the steel is soaked at a temperature in a (austenite-ferrite) dual phase temperature range or in an austenite single-phase temperature range, the soaked steel is rapidly cooled at a predetermined cooling rate for supercooling, and the cooled steel is held at the supercooling temperature for a predetermined time for austempering. The steel sheet may further be subjected to plating, and, where necessary, further to alloying treatment within ranges not causing significant decomposition of the desired structure and not adversely affecting the operation of the present invention.

Specific heat treatment conditions will be illustrated below, respectively in the case of (1) manufacturing a cold-rolled steel sheet in a continuous annealing line; and in the case of (2) manufacturing a hot-dip galvannealed steel sheet (GA steel sheet) in a hot-dip galvanization line.

(1) Manufacturing of Cold-rolled Steel Sheet in Continuous Annealing Line

For austenitimtion, the cold-rolled steel after cold rolling is held in a temperature range of [0.6Ac1+0.4Ac3] or higher (preferably [0.5Ac1+0.5Ac3] or higher) and 950° C. or lower (preferably 930° C. or lower), which temperature range is an (austenite-ferrite) dual phase temperature range or austenite single-phase temperature range, for a duration of 1800 seconds or shorter (preferably 900 seconds or shorter); supercooled by rapidly cooling at an average cooling rate of 7° C./second or more (preferably 10° C./second or more, more preferably 15° C./second or more, and particularly preferably 20° C./second or more) down to a temperature in the range of 350° C. to 500° C. (preferably 360° C. to 460° C., and more preferably 380° C. to 420° C.); held at the rapid-cooling stop temperature (supercooling temperature) for a duration of 100 to 1800 seconds (preferably 200 to 800 seconds) for austempering; and cooled down to mom temperature.

(2) Manufacture of Hot-Dip Galvannealed Steel Sheet (GA Steel Sheet) in Hot-Dip Galvanization Line For austenitization, the cold-rolled steel after cold rolling is held in a temperature range of [0.6Ac1+0.4Ac3] or higher (preferably [0.5Ac1+0.5Ac3] or higher) and 950° C. or lower (preferably 930° C. or lower), which temperature range is an (austenite-ferrite) dual phase temperature range or austenite single-phase temperature range, for a duration of 1800 seconds or shorter (preferably 900 seconds or shorter);

supercooled by rapidly cooling at an average cooling rate of 7° C./second or more (preferably 10° C./second or more, more preferably 15° C./second or more, and particularly preferably 20° C./second or more) down to a temperature in the range of 350° C. to 500° C. (preferably 360° C. to 460° C., and more preferably 380° C. to 420° C.); held at the rapid-cooling stop temperature (supercooling temperature) for a duration of 100 to 1800 seconds (preferably 200 to 800 seconds) for austempering (heat treatment conditions of this and precedent steps are the same as in (1)); subjected to an alloying treatment by reheating in a temperature range of 480° C. to 600° C. (preferably 480° C. to 550° C.) for a duration of 1 to 100 seconds; and cooled down to mom temperature.

For coarsening the structure, conditions for hot rolling and cold rolling may be controlled as mentioned above. Alternatively, a similar structure can be obtained by holding the steel at a temperature of from 500° C. up to the A1 point for a duration of 1 to 30 hours to coarsen the structure, as a pretreatment precedent to a heat treatment such as continuous annealing; and performing the heat treatment such as continuous annealing, while performing hot rolling and cold rolling under conditions as in customary treatments.

EXAMPLES

Experimental Example 1

[Analysis of Effects of Chemical Compositions and Manufacturing Conditions on Mechanical Properties of High-Strength Steel Sheets]

In Experimental Example 1, how mechanical properties of high-strength steel sheets vary depending on chemical compositions and manufacturing conditions was analyzed. Steel specimens having chemical compositions given in Table 1 were made by ingoting in a vacuum to give slabs 30 mm thick, the slabs were subjected to hot rolling and cold rolling under manufacturing conditions given in Table 2, and then heat-treated. Specifically, the slabs were heated to 1200° C., hot-rolled at a finishing mill delivery temperature (EDT) of T1° C. to a thickness oft mm, placed in a holding furnace at a coiling temperature of T2° C., air-cooled, and thus coiling of a hot-rolled sheet was simulated. The works were then cold-rolled to a cold rolling reduction of r % and yielded cold-rolled sheets 1.2 mm thick. The cold-rolled sheets were heated at a rate of 10° C./second up to a soaking temperature of T3° C., held at that temperature for 90 seconds, cooled at a cooling rate of R4° C./second, held at a supercooling temperature of T5° C. for a duration of t5 seconds, and air-cooled, or held at the supercooling temperature of T5° C. for the duration of t5 seconds, further held at a holding temperature of T6° C. for a duration of t6 seconds, and air-cooled.

The resulting steel sheets were examined to measure area percentages of respective phases; and carbon content ($C\gamma_R$), average equivalent circle diameter, and aspect ratio of retained austenite by the measurement methods described in "Description of Embodiments."

To evaluate cold (room-temperature) and warm mechanical properties, the steel sheets were subjected to measurements of tensile strength (TS), elongation [total elongation (EL)], and deep drawability [limiting drawing ratio (LDR)] at room temperature and 300° C., respectively, by the following procedures.

The tensile strength TS and elongation EL were measured through tensile tests using Japanese Industrial Standards (JIS) No. 5 specimens. The tensile tests were performed at a strain rate of 1 mm/second. The limiting drawing ratio LDR was measured by subjecting specimens having diameters of 80 to 140 mm to deep drawing using a cylindrical die having a die diameter of 53.4 mm, a punch diameter of 50.0 mm, and a shoulder radius R of 8 mm at a wrinkle flatting pressure of 9.8 kN.

The results are indicated in Tables 3 and 4.

TABLE 1

| Steel | Chemical composition (in mass percent) | | | | | | | | Transformation temperature (° C.) | |
|---|---|---|---|---|---|---|---|---|---|---|
| type | C | Si | Mn | P | S | Al | N | Other element | Ac1 | Ac3 |
| A | 0.18 | 1.50 | 2.00 | 0.010 | 0.001 | 0.030 | 0.0040 | — | 745 | 850 |
| B | 0.18 | 1.50 | 2.00 | 0.010 | 0.001 | 0.030 | 0.0040 | Ca: 0.010 | 745 | 850 |
| C | 0.18 | 1.50 | 2.00 | 0.010 | 0.001 | 0.030 | 0.0040 | Mg: 0.010 | 745 | 850 |
| Da | 0.03a | 1.50 | 2.00 | 0.010 | 0.001 | 0.030 | 0.0040 | Ca: 0.010 | 745 | 901 |
| Ea | 0.18 | 0.25a | 2.00 | 0.010 | 0.001 | 0.030 | 0.0040 | Ca: 0.010 | 709 | 794 |
| Fa | 0.18 | 4.00a | 2.00 | 0.010 | 0.001 | 0.030 | 0.0040 | Ca: 0.010 | 818 | 962 |
| Ga | 0.18 | 1.50 | 0.40a | 0.010 | 0.001 | 0.030 | 0.0040 | Ca: 0.010 | 758 | 886 |
| Ha | 0.18 | 1.50 | 4.00a | 0.010 | 0.001 | 0.030 | 0.0040 | Ca: 0.010 | 724 | 790 |
| I | 0.18 | 1.50 | 2.00 | 0.010 | 0.001 | 0.030 | 0.0040 | Cr: 0.15, Ca: 0.010 | 745 | 910 |
| J | 0.18 | 1.50 | 2.00 | 0.010 | 0.001 | 0.030 | 0.0040 | Mo: 0.20, Ca: 0.010 | 749 | 848 |
| K | 0.18 | 1.50 | 2.00 | 0.010 | 0.001 | 0.030 | 0.0040 | Cu: 0.50, Ca: 0.010 | 745 | 866 |
| L | 0.18 | 1.50 | 2.00 | 0.010 | 0.001 | 0.030 | 0.0040 | Ni: 0.40, Ca: 0.010 | 745 | 842 |
| M | 0.18 | 1.50 | 2.00 | 0.010 | 0.001 | 0.030 | 0.0040 | B: 0.0010, Ca: 0.010 | 745 | 850 |
| N | 0.18 | 2.50 | 2.80 | 0.010 | 0.001 | 0.030 | 0.0040 | Ca: 0.010, T: 0.0128 | 766 | 871 |
| Oa | 0.08 | 0.70a | 2.80 | 0.010 | 0.001 | 0.030 | 0.0040 | Ca: 0.010 | 722 | 832 |
| P | 0.22 | 1.00 | 1.50 | 0.010 | 0.001 | 0.030 | 0.0040 | Ca: 0.010 | 736 | 833 |
| Q | 0.12 | 2.00 | 2.50 | 0.010 | 0.001 | 0.030 | 0.0040 | Ca: 0.010 | 754 | 873 |
| R | 0.18 | 1.50 | 2.00 | 0.010 | 0.001 | 0.030 | 0.0040 | Ca: 0.010 | 745 | 850 |

Data with subscript "a" are out of the ranges specified in the present invention.

TABLE 2

| Manufacturing number | Steel type | Hot rolling conditions | | | Cold rolling conditions | Heat treatment conditions | | | | | |
|---|---|---|---|---|---|---|---|---|---|---|---|
| | | FDT T1 (°C.) | Coiling temperature T2 (°C.) | Finish thickness t (mm) | Cold reduction rate r (%) | Soaking temperature T3 (°C.) | Cooling rate R4 (°C./sec) | Supercooling temperature T5 (°C.) | Holding time t5 (sec) | Holding temperature T6 (°C.) | Holding time t6 (sec) |
| 1 | A | 950 | 650 | 1.4 | 14 | 920 | 40 | 400 | 300 | — | — |
| 2 | B | 950 | 650 | 1.4 | 14 | 920 | 40 | 400 | 300 | — | — |
| 3 | C | 950 | 650 | 1.4 | 14 | 920 | 40 | 400 | 300 | — | — |
| 4 | Da | 950 | 650 | 1.4 | 14 | 920 | 40 | 400 | 300 | — | — |
| 5 | Ea | 950 | 650 | 1.4 | 14 | 920 | 40 | 400 | 300 | — | — |
| 6 | Fa | 950 | 650 | 1.4 | 14 | 920 | 40 | 400 | 300 | — | — |
| 7 | Ga | 950 | 650 | 1,4 | 14 | 920 | 40 | 400 | 300 | — | — |
| 8 | Ha | 950 | 650 | 1.4 | 14 | 920 | 40 | 400 | 300 | — | — |
| 9 | I | 950 | 650 | 1.4 | 14 | 920 | 40 | 400 | 300 | — | — |
| 10 | J | 950 | 650 | 1.4 | 14 | 920 | 40 | 400 | 300 | — | — |
| 11 | K | 950 | 650 | 1.4 | 14 | 920 | 40 | 400 | 300 | — | — |
| 12 | L | 950 | 650 | 1.4 | 14 | 920 | 40 | 400 | 300 | — | — |
| 13 | M | 950 | 650 | 1.4 | 14 | 920 | 40 | 400 | 300 | — | — |
| 14 | N | 950 | 650 | 1.4 | 14 | 920 | 40 | 400 | 300 | — | — |
| 15 | Oa | 950 | 650 | 1.4 | 14 | 920 | 40 | 400 | 300 | — | — |
| 16 | P | 950 | 650 | 1.4 | 14 | 920 | 40 | 400 | 300 | — | — |
| 17 | Q | 950 | 650 | 1.4 | 14 | 920 | 40 | 400 | 300 | — | — |
| 18 | R | 950 | 650 | 1.4 | 14 | 920 | 30 | 400 | 300 | — | — |
| 19b | R | 880b | 400b | 1.4 | 14 | 920 | 40 | 400 | 300 | — | — |
| 20b | R | 950 | 650 | 2.5 | 52b | 920 | 40 | 400 | 300 | — | — |
| 21b | R | 950 | 650 | 1.2 | 0b | 780 | 40 | 400 | 300 | — | — |
| 22b | R | 950 | 650 | 1.4 | 14 | 920 | 5b | 400 | 300 | — | — |
| 23b | R | 950 | 650 | 1.4 | 14 | 920 | 40 | 400 | 300 | 620b | 10 |
| 24b | R | 950 | 650 | 1.4 | 14 | 920 | 40 | 330b | 300 | — | — |
| 25b | R | 950 | 650 | 1.4 | 14 | 920 | 40 | 400 | 2100b | — | — |
| 26 | R | 950 | 650 | 1.4 | 14 | 920 | 40 | 400 | 200 | 520 | 10 |
| 28 | R | 950 | 650 | 1.4 | 14 | 920 | 40 | 400 | 300 | — | — |
| 29 | R | 950 | 650 | 1.4 | 14 | 790 | 40 | 400 | 300 | — | — |
| 30 | R | 950 | 650 | 1.4 | 14 | 790 | 40 | 400 | 200 | 520 | 10 |
| 31 | R | 950 | 650 | 1.4 | 14 | 800 | 40 | 400 | 300 | — | — |
| 32 | R | 950 | 650 | 1.4 | 14 | 800 | 40 | 400 | 200 | 520 | 10 |
| 33 | R | 950 | 650 | 1.4 | 14 | 820 | 40 | 400 | 300 | — | — |
| 34 | R | 950 | 650 | 1.4 | 14 | 820 | 40 | 400 | 200 | 520 | 10 |

Manufacturing number 27: Unused number
Data with subscript "a" are out of the ranges specified in the present invention; and data with subscript "b" are out of recommended ranges in the present invention

TABLE 3

| Steel sheet number | Steel type | Manufacturing number | Structures | | | | | | |
|---|---|---|---|---|---|---|---|---|---|
| | | | Area percentage (%) | | | | | $\gamma_R$ | |
| | | | BF | F | M + $\gamma_R$ | $\gamma_R$ | Other structure | Carbon content (mass percent) | Average equivalent circle diameter (μm) |
| 1 | A | 1 | 80 | 0 | 20 | 7.0 | 0.0 | 1.0 | 0.40 |
| 2 | B | 2 | 80 | 0 | 20 | 7.0 | 0.0 | 1.0 | 0.40 |
| 3 | C | 3 | 80 | 0 | 20 | 7.0 | 0.0 | 1.0 | 0.40 |
| 4 | Da | 4 | 80 | 0 | 20 | 1.0a | 0.0 | 0.8 | 0.40 |
| 5 | Ea | 5 | 85 | 10 | 5a | 2.0a | 0.0 | — | — |
| 6 | Fa | 6 | 25a | 25 | 50 | 10.0 | 0.0 | 0.5 | 1.20 |
| 7 | Ga | 7 | 30a | 60a | 10 | 2.0a | 0.0 | 1.2 | 0.30 |
| 8 | Ha | 8 | 40a | 0 | 60a | 5.0 | 0.0 | 0.6 | 0.80 |
| 9 | I | 9 | 80 | 0 | 20 | 10.0 | 0.0 | 0.9 | 0.40 |
| 10 | J | 10 | 80 | 0 | 20 | 10.0 | 0.0 | 0.9 | 0.40 |
| 11 | K | 11 | 80 | 0 | 20 | 10.0 | 0.0 | 0.9 | 0.40 |
| 12 | L | 12 | 80 | 0 | 20 | 10.0 | 0.0 | 0.9 | 0.40 |
| 13 | M | 13 | 80 | 0 | 20 | 8.0 | 0.0 | 1.1 | 0.40 |
| 14 | N | 14 | 70 | 0 | 30 | 12.0 | 0.0 | 0.7 | 0.40 |
| 15 | Oa | 15 | 88 | 0 | 12 | 4.0a | 0.0 | 0.7 | 0.40 |
| 16 | P | 16 | 80 | 0 | 20 | 10.0 | 0.0 | 1.0 | 0.40 |

TABLE 3-continued

| Steel sheet number | Structures $\gamma_R$ Average aspect ratio (—) | Mechanical properties Cold properties | | | Temperature (° C.) | TS (MPa) | EL (%) | LDR (—) | Judgment |
|---|---|---|---|---|---|---|---|---|---|
| | | TS (MPa) | EL (%) | LDR (—) | | | | | |
| 1 | 1.8 | 1017 | 16.2 | 2.3 | 300 | 1036 | 26.3 | 2.4 | Accepted |
| 2 | 1.8 | 1026 | 16.2 | 2.3 | 300 | 1016 | 26.5 | 2.4 | Accepted |
| 3 | 1.8 | 989 | 16.3 | 2.3 | 300 | 1029 | 27.0 | 2.4 | Accepted |
| 4 | 1.8 | 1000 | 8.2a | 1.5a | 300 | 1024 | 10.8a | 1.5a | Rejected |
| 5 | — | 846a | 15.6 | 1.5a | 300 | 870a | 26.0 | 1.5a | Rejected |
| 6 | 1.8 | 1196 | 13.0 | 1.3a | 300 | 1220 | 20.7a | 1.3a | Rejected |
| 7 | 1.8 | 801a | 25.7 | 2.0a | 300 | 819a | 25.7 | 2.0a | Rejected |
| 8 | 1.8 | 1349 | 7.5a | 1.3a | 300 | 1381 | 10.5a | 1.5a | Rejected |
| 9 | 1.8 | 1036 | 20.9 | 2.3 | 300 | 1062 | 27.4 | 2.4 | Accepted |
| 10 | 1.8 | 1056 | 20.1 | 2.3 | 300 | 1065 | 28.0 | 2.4 | Accepted |
| 11 | 1.8 | 1074 | 20.4 | 2.3 | 300 | 1075 | 27.2 | 2.4 | Accepted |
| 12 | 1.8 | 1054 | 20.8 | 2.3 | 300 | 1087 | 27.6 | 2.4 | Accepted |
| 13 | 1.8 | 1060 | 17.1 | 2.3 | 300 | 1070 | 25.2 | 2.4 | Accepted |
| 14 | 1.8 | 1192 | 14.2 | 2.3 | 300 | 1239 | 23.0 | 2.4 | Accepted |
| 15 | 1.8 | 1013 | 15.9 | 2.2 | 300 | 1038 | 22.5a | 2.3a | Rejected |
| 16 | 1.8 | 984 | 20.2 | 2.3 | 300 | 1018 | 27.7 | 2.4 | Accepted |

Data with subscript "a" are out of the ranges specified in the present invention; and data with subscript "b" are out of recommended ranges in the present invention.
BF: Bainitic ferrite, F: Polygonal ferrite, M: Martensite, $\gamma_R$: Retained austenite
"Accepted": Having TS of 980 MPa or more, having EL of 15% or more (when having TS of less than 1180 MPa) or EL of 13% or more (when having TS of 1180 MPa or more), and having LDR of 2.2 or more as cold properties and having TS of 980 MPa or more, having EL of 23% or more, and having LDR of 2.4 or more as warm properties; "Rejected": Not satisfying the conditions specified as "Accepted."

TABLE 4

(Continuation of Table 3)

| Steel sheet number | Steel type | Manufacturing number | Structures Area percentage (%) | | | | | Carbon content (mass percent) | $\gamma_R$ Average equivalent circle diameter (μm) |
|---|---|---|---|---|---|---|---|---|---|
| | | | BF | F | M + $\gamma_R$ | $\gamma_R$ | Other structure | | |
| 17 | Q | 17 | 80 | 0 | 20 | 8.0 | 0.0 | 0.8 | 0.40 |
| 18 | R | 18 | 65 | 15 | 20 | 8.0 | 0.0 | 0.9 | 0.60 |
| 19 | R | 19b | 85 | 0 | 15 | 8.0 | 0.0 | 1.0 | 0.15a |
| 20 | R | 20b | 88 | 0 | 12 | 8.0 | 0.0 | 1.3a | 0.15a |
| 21 | R | 21b | 10a | 65a | 25 | 7.0 | 0.0 | 1.0 | 1.30 |
| 22 | R | 22b | 35a | 50a | 15 | 5.0 | 0.0 | 0.8 | 0.60 |
| 23 | R | 23b | 85 | 0 | 15 | 1.5a | 0.0 | 0.8 | 0.22 |
| 24 | R | 24b | 80 | 0 | 15 | 7.0 | 0.0 | 1.3a | 0.28 |
| 25 | R | 25b | 93a | 0 | 7a | 6.0 | 0.0 | 1.3a | 1.00 |
| 26 | R | 26 | 87 | 0 | 13 | 7.0 | 0.0 | 1.2 | 1.00 |
| 28 | R | 28 | 80 | 0 | 20 | 7.0 | 0.0 | 1.0 | 0.40 |
| 29 | R | 29 | 50 | 35 | 15 | 9.0 | 0.0 | 0.8 | 1.10 |
| 30 | R | 30 | 50 | 35 | 15 | 8.0 | 0.0 | 0.8 | 1.00 |
| 31 | R | 31 | 55 | 25 | 20 | 11.0 | 0.0 | 0.8 | 1.20 |
| 32 | R | 32 | 55 | 25 | 20 | 10.0 | 0.0 | 0.8 | 1.00 |
| 33 | R | 33 | 65 | 10 | 25 | 10.0 | 0.0 | 0.8 | 1.10 |
| 34 | R | 34 | 65 | 10 | 25 | 9.0 | 0.0 | 0.8 | 1.00 |

| Steel sheet number | Structures $\gamma_R$ Average aspect ratio (—) | Mechanical properties Cold properties | | | Warm properties | | | | Judgment |
|---|---|---|---|---|---|---|---|---|---|
| | | TS (MPa) | EL (%) | LDR (—) | Temperature (° C.) | TS (MPa) | EL (%) | LDR (—) | |
| 17 | 1.8 | 995 | 16.3 | 2.3 | 300 | 1011 | 23.6 | 2.4 | Accepted |
| 18 | 1.8 | 1005 | 19.0 | 2.3 | 300 | 1031 | 28.8 | 2.4 | Accepted |
| 19 | 1.8 | 991 | 17.4 | 2.1a | 300 | 1021 | 18.8a | 2.1a | Rejected |
| 20 | 1.8 | 991 | 18.0 | 2.1a | 300 | 1019 | 19.0a | 2.1a | Rejected |
| 21 | 1.8 | 849a | 20.9 | 1.5a | 300 | 881a | 25.4 | 2.4 | Rejected |
| 22 | 1.8 | 913a | 18.7 | 2.3 | 300 | 930a | 25.7 | 2.4 | Rejected |

TABLE 4-continued (Continuation of Table 3)

| | | | | | | | | | |
|---|---|---|---|---|---|---|---|---|---|
| 23 | 1.8 | 1027 | 13.1a | 1.8a | 300 | 1020 | 15.2a | 1.8a | Rejected |
| 24 | 3.5a | 1009 | 18.0 | 2.1a | 300 | 1031 | 20.1a | 2.1a | Rejected |
| 25 | 1.8 | 892a | 18.6 | 2.3 | 300 | 921a | 27.2 | 2.4 | Rejected |
| 26 | 1.8 | 1028 | 17.2 | 2.3 | 300 | 1034 | 27.6 | 2.4 | Accepted |
| 28 | 1.8 | 1025 | 16.2 | 2.3 | 300 | 1018 | 26.9 | 2.4 | Accepted |
| 29 | 1.8 | 986 | 21.0 | 2.3 | 300 | 1010 | 27.5 | 2.4 | Accepted |
| 30 | 1.8 | 990 | 20.7 | 2.3 | 300 | 1015 | 27.3 | 2.4 | Accepted |
| 31 | 1.8 | 1001 | 20.5 | 2.3 | 300 | 1023 | 27.9 | 2.4 | Accepted |
| 32 | 1.8 | 1004 | 20.0 | 2.3 | 300 | 1027 | 27.7 | 2.4 | Accepted |
| 33 | 1.8 | 1008 | 19.6 | 2.3 | 300 | 1030 | 27.0 | 2.4 | Accepted |
| 34 | 1.8 | 1010 | 19.3 | 2.3 | 300 | 1033 | 27.2 | 2.4 | Accepted |

Data with subscript "a" are out of the ranges specified in the present invention; and data with subscript "b" are out of recommended ranges in the present invention.
BF: Bainitic ferrite, F: Polygonal ferrite, M: Martensite, $\gamma_R$: Retained austenite
"Accepted": Having TS of 980 MPa or more, having EL of 15% or more (when having TS of less than 1180 MPa) or EL of 13% or more (when having TS of 1180 MPa or more), and having LDR of 2.2 or more as cold properties and having TS of 980 MPa or more, having EL of 23% or more, and having LDR of 2.4 a more as warm properties; "Rejected": Not satisfying the conditions specified as "Accepted."

These tables demonstrate as follows. Steel Sheets Nos. 1 to 3, 9 to 14, 16 to 18, 26, and 28 to 34 employed steels having chemical compositions satisfying the conditions specified in the present invention and had been manufactured under recommended manufacturing conditions. As a result, the steel sheets were inventive steel sheets having structures satisfying the conditions in the present invention, had both acceptable cold properties and acceptable warm properties, and acted as highly formable high-strength steel sheets.

In contrast, Steel Sheets Nos. 4 to 8, 15, and 19 to 25 were comparative steel sheets not satisfying at least one of conditions in the chemical composition and structure specified in the present invention and failed to have acceptable cold properties and/or acceptable warm properties.

FIG. 1 illustrates how retained austenite is distributed in structures of an inventive steel sheet (Steel Sheet No. 28) and a comparative steel sheet (Steel Sheet No. 24). FIG. 1 depicts photographs obtained in EBSP observation, in which a white granular substance is identified as retained austenite. FIG. 1 apparently demonstrates that the inventive steel sheet (Steel Sheet No. 28) included retained austenite being more coarse and more satisfactorily equiaxial as compared to the comparative steel sheet (Steel Sheet No. 24).

Experimental Example 2

[Analysis of Appropriate Temperature Range in Warm Working]

Next, Steel Sheet No. 28 was subjected to heat treatments at different heating temperatures of from 150° C. to 450° C., and warm properties of the resulting articles were measured so as to analyze an appropriate temperature range upon warm working of inventive steel sheets. The results are indicated in Table 5, in which data at a temperature of 300° C. are as with the warm properties of Steel Sheet No. 28 in Table 4.

TABLE 5

| Temperature (° C.) | TS (MPa) | EL (%) | LDR (—) | Judgment |
|---|---|---|---|---|
| 150a | 989 | 17.4a | 20a | Rejected |
| 250 | 1011 | 24.5 | 24 | Accepted |

TABLE 5-continued

| Temperature (° C.) | TS (MPa) | EL (%) | LDR (—) | Judgment |
|---|---|---|---|---|
| 300 | 1018 | 26.9 | 24 | Accepted |
| 350 | 995 | 24.3 | 24 | Accepted |
| 450a | 881a | 26.6 | 20a | Rejected |

Data with subscript "a" are out of the ranges specified in the warm working method of the present invention.
Accepted: Having TS of 980 MPa or more, and EL of 23% or more, and LDR of 24 or more.
Rejected: Not satisfying the condition specified in "Accepted"

Table 5 demonstrates that specimens subjected to a heat treatment at a temperature in the range of from 200° C. to 400° C. had acceptable warm properties satisfying the criteria and exhibited superior warm formability in a wide temperature range, whereas specimens subjected to a heat treatment at a temperature of lower than 200° C. or higher than 400° C. failed to satisfy the criteria in warm properties.

Experimental Example 3

[Analysis of How Working Temperature Affects Strength Variation in Parts]

Specimens of Steel Sheet No. 26 were held at room temperature and 300° C., respectively, as intact (true strain: 0%) without working through application of true strain, or subjected to working to apply 5% true strain at room temperature and 300° C., respectively. The resulting samples were subjected to tensile tests at room temperature again, whereby yield strengths (YS) of the specimens were measured. These were performed to examine how the working temperature affects the strength variation due to strain distribution in parts obtained by working of inventive steel sheets. The results are indicated in Table 6.

TABLE 6

| Working Temperature (° C.) | Yield strength YS1 of As-is specimen (MPa) | Yield strength YS2 of 5%-worked specimen (MPa) | YS2 − YS1 (MPa) |
|---|---|---|---|
| Room temperature | 650 | 920 | 270 |
| 300 | 820 | 920 | 100 |

Table 6 demonstrates that a part obtained by warm-working of the inventive steel sheet had a smaller variation in yield strength due to difference in working magnitude in the part and thereby had a higher strength as a part, as compared to a part obtained by cold working.

While the present invention has been described in detail with reference to preferred embodiments thereof with a certain degree of particularity, it will be understood by those skilled in the art that various changes and modifications are possible without departing from the spirit and scope of the invention.

The present application is based on Japanese Patent Application No. 2010-258151 filed on Nov. 18, 2010 and Japanese Patent Application No. 2011-180616 filed on Aug. 22, 2011, the entire contents of which are incorporated herein by reference.

INDUSTRIAL APPLICABILITY

The present invention is applicable to cold-rolled steel sheets, hot-clip galvanized steel sheets, and hot-dip galvannealed steel sheets to give steel sheets having high strengths and satisfactory workability, and the resulting steel sheets are advantageously usable typically for automobile framework parts.

The invention claimed is:

1. A steel sheet, comprising:
C in a content of 0.05% to 0.3%;
Si in a content of 1% to 3%;
Mn in a content of 0.5% to 3%;
P in a content of 0% to 0.1%;
S in a content of 0% to 0.01%;
Al in a content of 0.001% to 0.1%; and
N in a content of 0.002% to 0.03%,
in mass percent,
wherein:
the steel sheet further comprises iron and impurities;
the steel sheet has a structure comprising:
 bainitic ferrite in a content of 50% to 65%;
 retained austenite in a content of 5% to 20%;
 martensite in a content of 11% or more;
 martensite and the retained austenite in a total content of 16% to 50%; and
 polygonal ferrite in a content of 0% to 40%,
in area percent based on the entire structure; and
the retained austenite has a carbon content (C$\gamma$R) of 0.5% to 1.2% in mass percent, an average equivalent circle diameter of 0.2 to 2 μm, and an average aspect ratio of less than 3.0, where an aspect ratio of a retained austenite grain is expressed as a ratio of a maximum diameter to a minimum diameter of the grain.

2. The steel sheet of claim 1, further comprising, in mass percent, at least one element selected from the group consisting of:
Cr in a content of 0.01% to 3%;
Mo in a content of 0.01% to 1%;
Cu in a content of 0.01% to 2%;
Ni in a content of 0.01% to 2%; and
B in a content of 0.00001% to 0.01%.

3. The steel sheet of claim 1, further comprising, in mass percent, at least one element selected from the group consisting of:
Ca in a content of 0.0005% to 0.01%;
Mg in a content of 0.0005% to 0.01%; and
a rare-earth element (REM) in a content of 0.0001% to 0.01%.

4. The steel sheet of claim 2, further comprising, in mass percent, at least one element selected from the group consisting of:
Ca in a content of 0.0005% to 0.01%;
Mg in a content of 0.0005% to 0.01%; and
a rare-earth element (REM) in a content of 0.0001% to 0.01%.

5. A method of warm-working a steel sheet, the method comprising:
heating the steel sheet of claim 1 up to a temperature of 200° C. to 400° C.; and
working the steel sheet within 3600 seconds after the heating.

* * * * *